(12) United States Patent
Momayez et al.

(10) Patent No.: US 10,097,131 B2
(45) Date of Patent: Oct. 9, 2018

(54) SMART FLOATING PLATFORMS

(71) Applicant: The Arizona Board of Regents on Behalf of the University of Arizona, Tucson, AZ (US)

(72) Inventors: Moe Momayez, Tucson, AZ (US); Nathan Barba, Goodyear, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 459 days.

(21) Appl. No.: 14/836,910

(22) Filed: Aug. 26, 2015

(65) Prior Publication Data
US 2016/0059938 A1  Mar. 3, 2016

Related U.S. Application Data

(60) Provisional application No. 62/042,169, filed on Aug. 26, 2014.

(51) Int. Cl.
*B63B 35/38* (2006.01)
*H02S 10/40* (2014.01)
(Continued)

(52) U.S. Cl.
CPC .............. *H02S 10/40* (2014.12); *B63B 35/38* (2013.01); *B63B 35/50* (2013.01); *B63H 5/07* (2013.01);
(Continued)

(58) Field of Classification Search
CPC .......... H02S 10/40; B63B 35/38; B63B 35/50
(Continued)

(56) References Cited

U.S. PATENT DOCUMENTS 3,844,236 A * 10/1974 Boyajian ................. B63B 35/34
114/266
4,067,285 A *  1/1978 Jones ....................... B63B 5/18
114/266
(Continued)

FOREIGN PATENT DOCUMENTS

CA       2543823 A1 * 10/2007  ............. F03G 6/001
WO  2006/011158 A3    2/2006
(Continued)

OTHER PUBLICATIONS

"Task 5: Floating Solar Cells," The Institute for Energy & the Environment: Environmental Design Contest 2013, New Mexico State University, http://www.ieenmsu.com/werc-2/design-contest-2014/tasks/task-5-floating-solar-cells/, accessed Sep. 15, 2015.
(Continued)

*Primary Examiner* — S. Joseph Morano
*Assistant Examiner* — Jovon Hayes
(74) *Attorney, Agent, or Firm* — Blank Rome LLP

(57) ABSTRACT

Disclosed are modular floating platforms configured to be joined together to form a cover over surfaces of natural and artificial bodies of water and other liquids, for reducing evaporation and other purposes. The floating platforms may be motorized and provided with remote control systems, so that the platforms may be assembled together on command to provide uniform coverage of the surface of the body of water. The floating platforms are optionally capable of solar and wind power collection. The platforms are useful for covering mining tailing storage ponds.

30 Claims, 9 Drawing Sheets

(51) Int. Cl.
  *B63B 35/50* (2006.01)
  *B63H 5/07* (2006.01)
  *H02S 20/00* (2014.01)
  *F24S 20/70* (2018.01)

(52) U.S. Cl.
  CPC .............. *H02S 20/00* (2013.01); *F24S 20/70* (2018.05); *Y02E 10/50* (2013.01)

(58) Field of Classification Search
  USPC ..................................... 440/6; 114/264, 266
  See application file for complete search history.

(56) References Cited

U.S. PATENT DOCUMENTS

| | | | | |
|---|---|---|---|---|
| 5,524,549 | A * | 6/1996 | Morris | B63B 35/34 |
| | | | | 114/264 |
| 6,860,219 | B1 * | 3/2005 | Dempster | B63B 21/22 |
| | | | | 114/264 |
| 7,000,558 | B2 | 2/2006 | Johnson | B63B 3/08 |
| | | | | 114/266 |
| 8,967,068 | B2 * | 3/2015 | Yang | B63B 35/44 |
| | | | | 114/122 |
| 9,712,108 | B2 * | 7/2017 | Kokotov | H02S 40/36 |
| 2005/0051073 | A1 * | 3/2005 | Johnson | B63B 3/08 |
| | | | | 114/266 |
| 2012/0305051 | A1 * | 12/2012 | Kokotov | B63B 21/50 |
| | | | | 136/246 |
| 2015/0007872 | A1 * | 1/2015 | Cap | E04D 11/005 |
| | | | | 136/251 |
| 2016/0006391 | A1 * | 1/2016 | Kokotov | H02S 20/30 |
| | | | | 136/244 |
| 2016/0059938 | A1 * | 3/2016 | Momayez | H02S 10/40 |
| | | | | 440/6 |

FOREIGN PATENT DOCUMENTS

| | | | | | |
|---|---|---|---|---|---|
| WO | WO 2006011158 | A2 * | 2/2006 | ............ | G08G 1/202 |
| WO | 2010/064271 | A2 | 6/2010 | | |
| WO | WO 2010064271 | A2 * | 6/2010 | ............ | F24J 2/5241 |
| WO | 2013/093945 | A1 | 6/2013 | | |
| WO | WO 2013093945 | A1 * | 6/2013 | ............ | H02S 20/00 |
| WO | WO 2014005626 | A1 * | 1/2014 | ............... | F24J 2/523 |

OTHER PUBLICATIONS

Annavarapu, Srikant, et al., "Geotechnical Considerations for Solar Panel Installation on Mine Tailings," 2009 Meeting of the American Society of Mining and Reclamation, Billings, Montana, Revitalizing the Environment: Proven Solutions and Innovative Approaches, May 30-Jun. 5, 2009, Published by ASMR, Lexington, KY, http://www.azrise.org/wp-content/uploads/2012/12/Geotechnical-Considerations.pdf.

Momayez, Moe, "Solar PV Power Plants on Mine Tailings: Making the Case for Mining the Sun," 2010 SME Annual Conference, Phoenix, AZ, http://www.imr.arizona.edu/research/project_2a.html.

Momayez, Moe, et al., "An Investigation to Use Tailing Ponds as Solar Photovoltaic Farms," 2009 Meeting of the American Society of Mining and Reclamation, Billings, Montana, Revitalizing the Environment: Proven Solutions and Innovative Approaches, May 30-Jun. 5, 2009, Published by ASMR, Lexington, KY, http://www.azrise.org/wp-content/uploads/2013/07/Tailing-Ponds.pdf.

"Producing Solar Energy While Saving Water," Solar Panels, "Floating Windbreakers" Prevention Evaporation and Protect Drinking Water, SunEdison, http://www.sunedison.com/wps/wcm/connect/b16fe5ba-78b4-4f1a-a733-21bd056dfe7e/Case_Study_Narmada-FINAL.pdf?MOD=AJPERES&CACHEID=b16fe5ba-78b4-4f1a-a733-21bd056dfe7e.

* cited by examiner

SMART FLOATING PLATFORMS

CROSS-REFERENCE TO RELATED APPLICATION

This application claims priority to U.S. Provisional Application No. 62/042,169, filed on Aug. 26, 2014, the entire contents of which are incorporated herein for all legal purposes.

FIELD OF THE INVENTION

The invention relates to mine tailing storage ponds.

BRIEF SUMMARY OF THE INVENTION

Disclosed herein are modular floating platforms that are configured to be joined together to form a cover over surfaces of natural and artificial bodies of water and other liquids. The floating platforms may be motorized and provided with remote control systems, so that the platforms may be assembled together on command to provide uniform coverage of the surface of the body of water. The floating platforms may also be provided with additional components, such as solar energy collection panels, and wind energy turbines. The platform and systems are useful to reduce evaporation from bodies of water, and have other uses as well. Particular bodies of water in which the platform, and systems comprising more than one of the platforms, is useful include but are not limited to mining tailing storage ponds.

BRIEF DESCRIPTION OF THE DRAWINGS

FIG. 2B includes spherical buoyancy elements.

DETAILED DESCRIPTION OF THE INVENTION

Figure 1A:
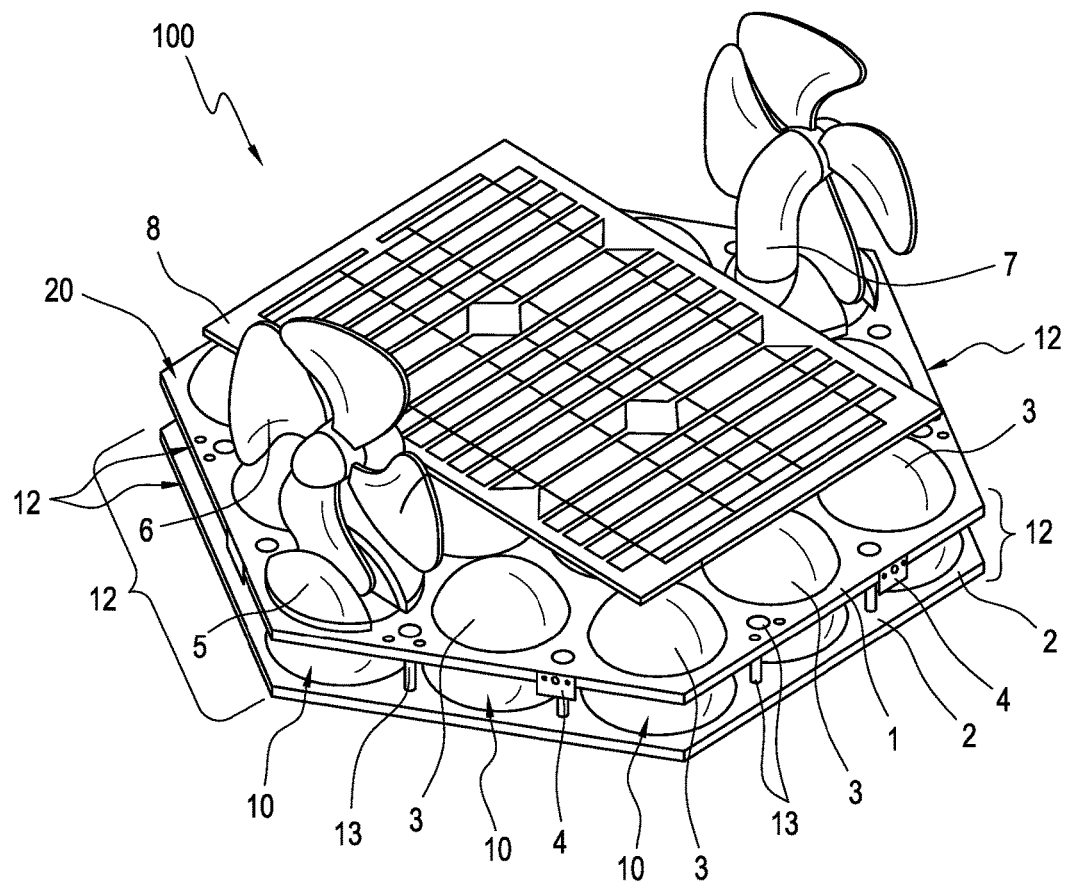
FIG. 1A is a perspective view.

In mining, fine-grinding of ores for the liberation of metal or other valuable concentrates typically requires large acreage dedicated to holding or storage of tailings impoundments. These tailing impoundments are generally made up of a slurry of water and various sized mineral particles in a large exposed pond. The water can be re-used in mining processes or for other industrial purposes. However, the water in these ponds tends to evaporate, due to the structure of the ponds and the environment in which they exist. For stability purposes, the surfaces of tailings storage ponds are slightly graded towards the center and therefore have shallow depths near the edges of the ponds which facilitates evaporation. Given the large surface area where the supernatant water tends to accumulate (in the order of few square miles), and the hot, windy climates in which many mining operations occur, high evaporation rates are typical. For example, in the southwest United States, evaporation rates in excess of 100 inches a year are observed.

Described herein, in conjunction with the drawing figures, is a modular system that provides a practical, cost-efficient, and modifiable solution for various applications, in the mining industry and for many different types of open bodies of water, to minimize water surface exposure to air, resulting in reduced evaporation of water. The system disclosed herein can also be used to maintain the temperature of the body of water, or to change its temperature.

The modular floating platforms described herein comprise one or more floating panels that are configured to be joined together to form a cover over surfaces of tailings ponds and other natural and artificial bodies of water or other liquids, to reduce evaporation therefrom.

The platforms are preferably utilized in the following manner. Either a plurality of individual platforms according to the invention, or an assembly or system comprising multiple floating platforms are deployed onto the surface of a pond or other body of water containing water and/or other liquids. If a plurality of platforms is deployed on the pond, the platforms may thereafter be joined together on the pond's surface, to form the assembly or system. The term "pond" as used herein refers to any body of water or liquids, including but not limited to mine-tailing ponds. Also included in the term "pond" are water storage and recreation reservoirs, lakes, and ponds, as well as bodies of water used in water treatment facilities.

In a preferred embodiment, modular floating platforms are provided with propulsion and control systems, which permit the platforms to be guided towards one another and form an assembly or system, wherein the system is capable of providing uniform coverage of the water in ponds.

A system comprising multiple floating platforms according to the invention can be moved, and also assembled and disassembled at the operator's discretion and under the operator's control. For example, the floating platforms can be moved away from an area of the pond where the mine tailing deposition is taking place, significantly reducing or removing the possibility of the platforms coming into contact with the tailings and getting damaged or even submerged. The panels then may be later reassembled away from the shore or tailings depositing operation, to create a continuous cover over the pond's surface.

Optionally, the platforms and systems can be provided with further components and systems, to provide additional functions. For example, the platforms can be provided with solar energy collection apparatus, wind energy harnessing apparatus, batteries and/or hydroponic horticulture apparatus.

Each platform may be used by itself, but more preferably two or more platforms are used in conjunction to form a system. The number of platforms used in a given situation will depend upon various factors, such as the size of the platform itself and the surface area of the pond desired to be covered.

When two or more platforms are used in conjunction, they are preferably maintained in close proximity to one another, so as to form a substantially continuous covering over the pond's surface. As used herein, the term "substantially continuous" means that little or no surface of the pond would be visible between the platforms if the system were to be viewed from above, e.g., an aerial view.

The degree of coverage of the pond surface that is provided by a given system using multiple platforms having the same shape and size, will vary based upon the particular shape of the platforms employed. For example, platforms having circular or ellipsoid shapes, which have rounded edges, will tend to provide a lesser degree of coverage of the pond surface, as compared with platforms that have straight edges.

Figure 1B:
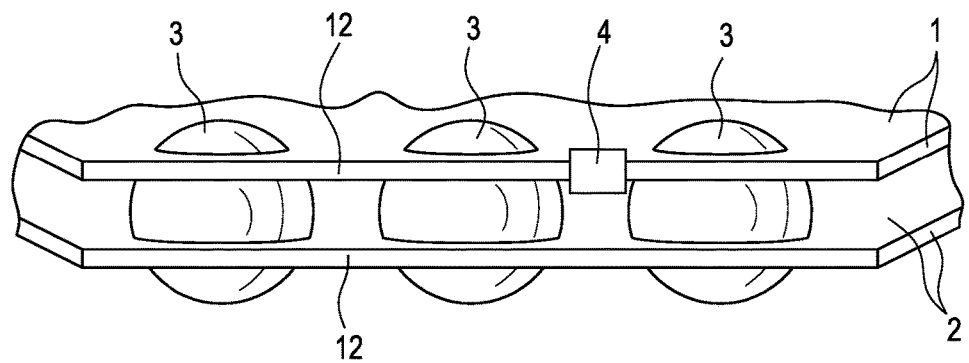
FIG. 1B is a side view, of a modular floating platform comprising two panels, according to an embodiment of the invention.
Figure 2A:
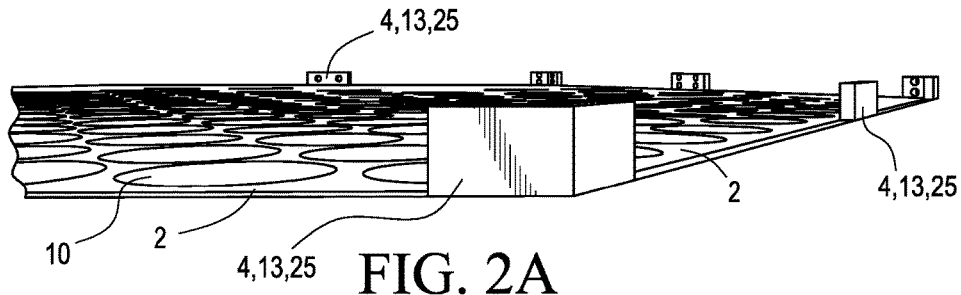
FIG. 2A is a perspective view of a portion of a panel used in manufacturing a platform having two panels according to an embodiment of the invention.
Figure 2B:
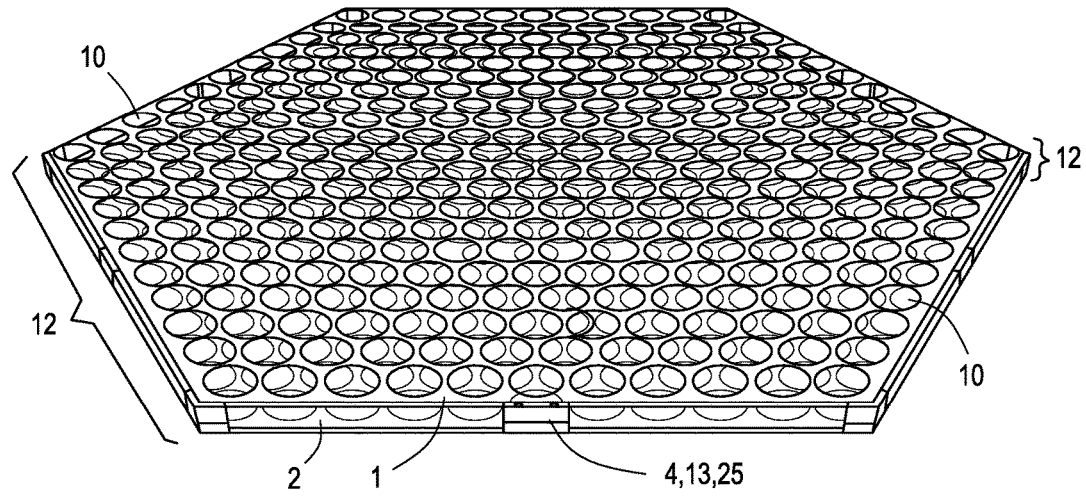
FIGS. 2B and 2C are perspective views of a modular floating platform comprising two panels, according to another embodiment of the invention.
Figure 2C:
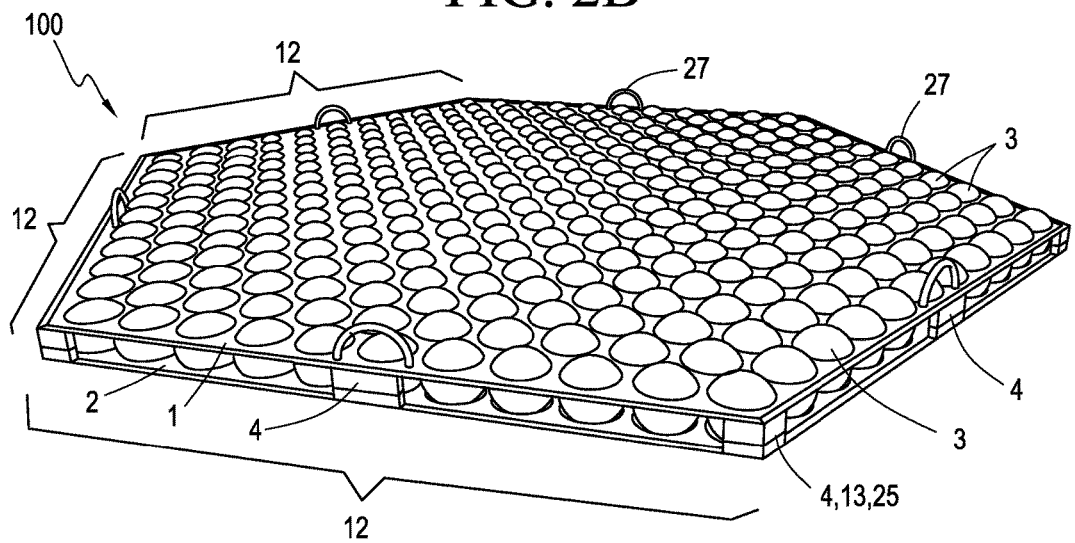
Figure 3:
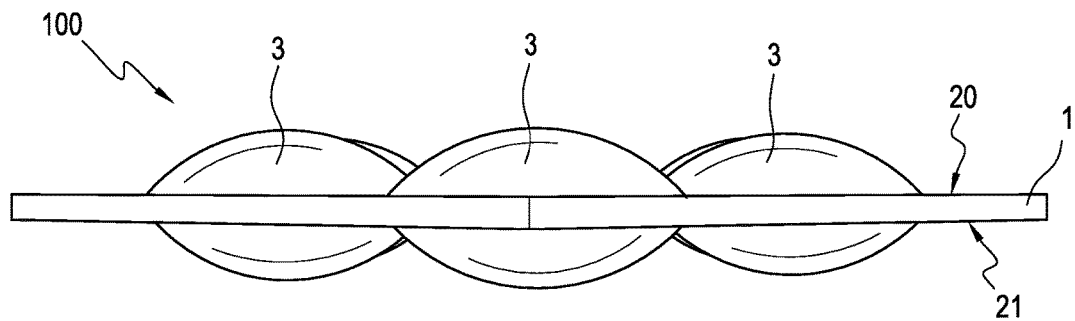
FIG. 3 is a side view of a modular floating platform comprising one panel, according to another embodiment of the invention.
Figure 4:
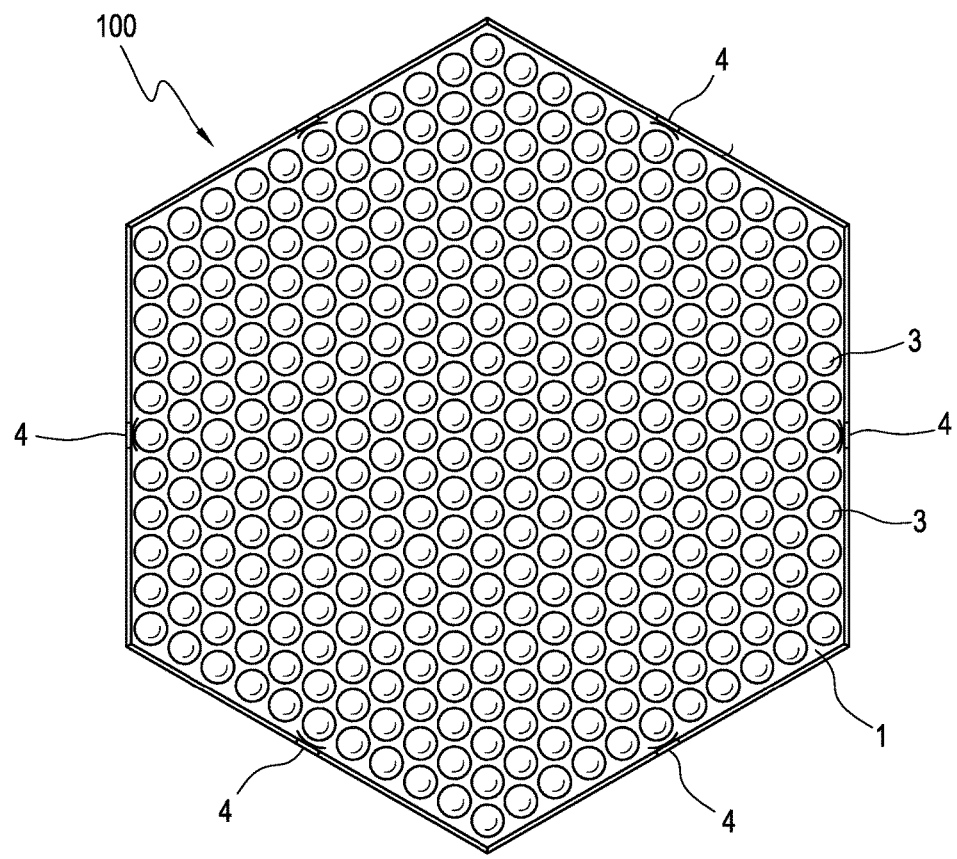
FIG. 4 is a top view of a modular floating platform according to an embodiment of the invention.

As illustrated in the accompanying figures, the modular floating platform 100 generally comprises at least one substantially planar panel 1, 2 having a top face 20, a bottom face 21 and at least one edge 12; a buoyancy element 3 integrated on or in the panel 1, 2; and a coupler on or adjacent the edge 12 of the panel for joining the platform to another modular buoyant platform. In some embodiments, the platform 100 comprises only one planar panel (such as shown in FIG. 3), and in other embodiments, the platform comprises two or more planar panels (such as shown in FIG. 1). If two or more panels are used in a platform according to the invention, the panels may be held together (i.e., joined to one another) by a connector 13 comprising any suitable means. Non-limiting examples include bolts, screws, ties, staples, cords and chains. In a preferred embodiment, the connector 9 also provides structure and/or stability to the platform, such as shown in FIGS. 2A, 2B, 2C and 11, wherein the connector is a substantially solid piece incorporated into one or more edges of the platform 100. In a still more preferred embodiment, one or more of the connectors 13 are integrated with one or more of the couplers 4 for joining edges of one platform to another.

The top face 20 and bottom face 21 of each panel are parallel to one another. When the platform 100 is in use, the top face 20 and bottom face 21 are both parallel to the surface of the pond, and the top face 20 is furthest from the surface of the pond, and the bottom face 21 is closest to the surface of the pond.

The top face 20 of the platform 100 is the portion of the platform which, when the platform is in use, is viewable from directly above (i.e., an aerial or "bird's eye view"). The top face 20 generally defines the shape of the panel or panels. The panels, and thus the top of the platform, can be of virtually any shape, such as hexagonal, trapezoidal, circular, elliptical, rectangular, square or triangular. Hexagonal, trapezoidal, rectangular, square and triangular shapes are preferred.

Even more preferably, the platform 100 is substantially hexagonal-shaped when in use and viewed from above. When multiple hexagonal-shaped platforms 100 are joined together, the system 200 provides a relatively greater degree of surface coverage as compared to other geometric shapes. In the hexagonal-shaped embodiment, each of the six edges 12 of the platform 100 abuts an edge of another platform 100, forming the system 200 comprising a substantially continuous cover over the pond surface.

Figure 5:
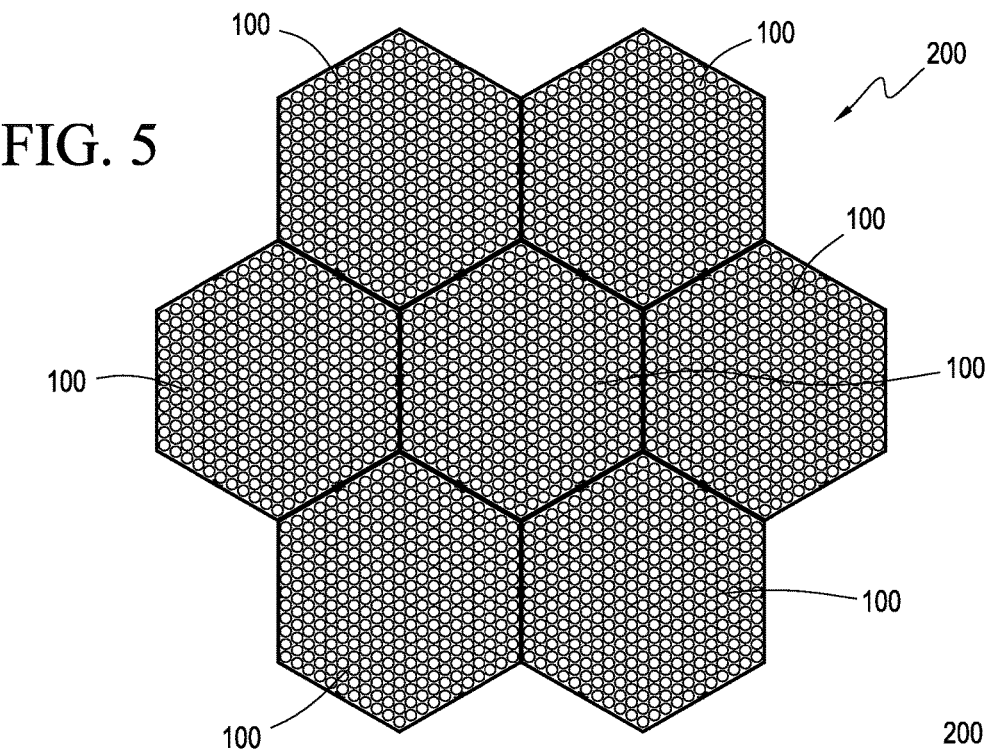
FIGS. 5 and 6 are each top views of systems each comprising a plurality of modular floating platforms joined together according to an embodiment of the invention. The system of FIG. 5 comprises seven platforms, and the system of FIG. 6 comprises ten platforms.
Figure 6:
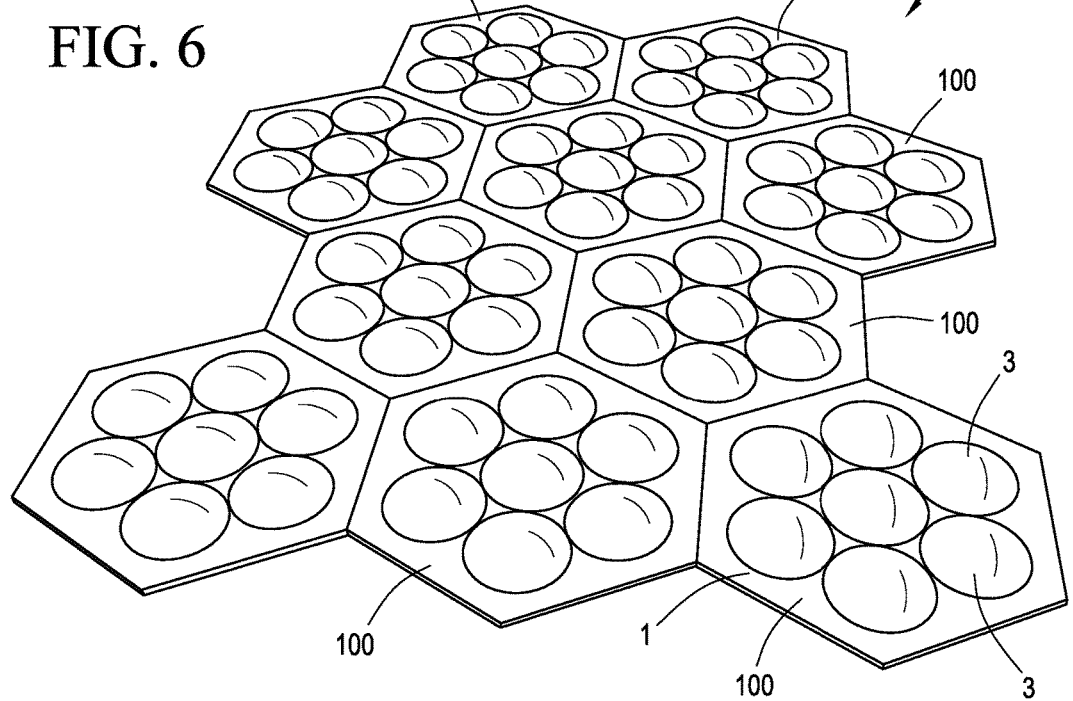
Figure 12:
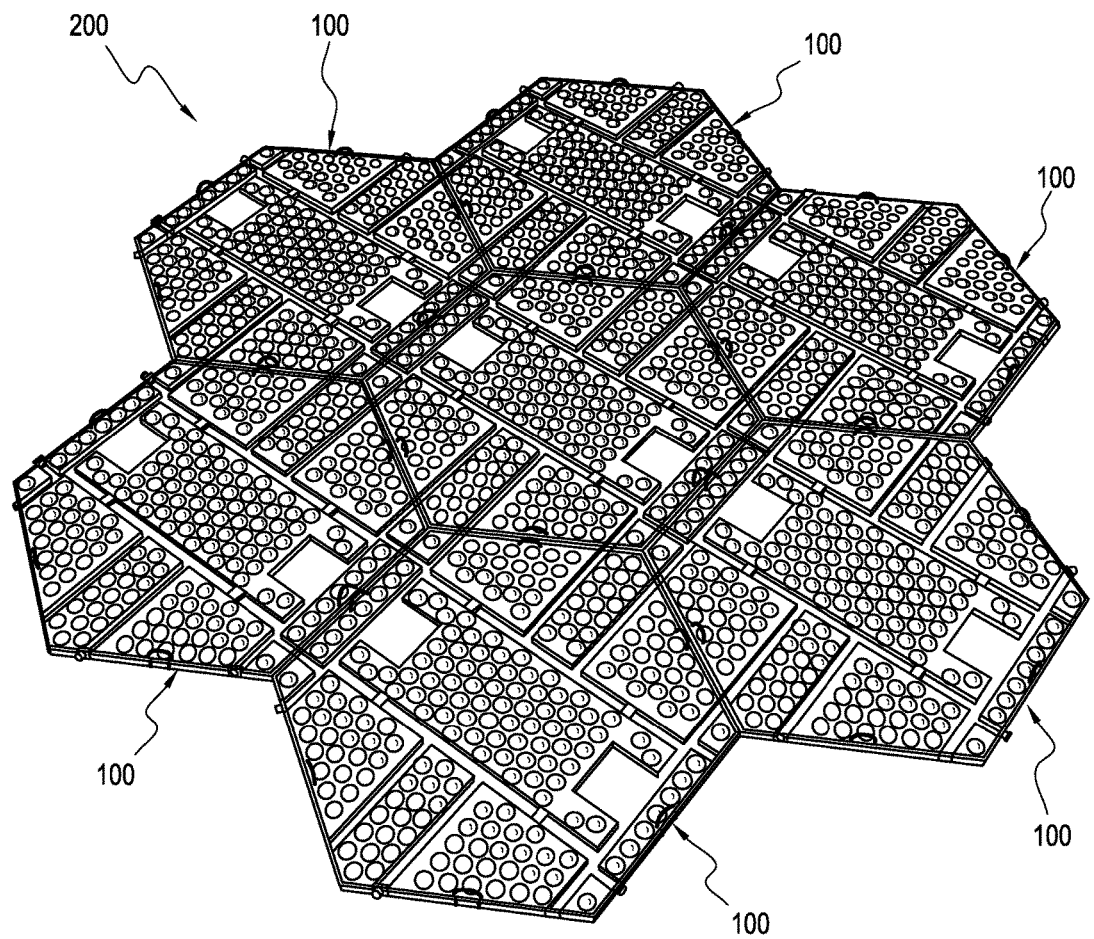
FIG. 12 is a perspective view of a system comprising seven modular floating platforms joined together according to an embodiment of the invention.

FIGS. 5, 6 and 12 illustrate two different embodiments of a system 200 comprising a plurality of platforms 100. These figures each show an assembly or system comprising seven hexagonal-shaped platforms 100. However, the assemblies or systems according to the invention may include a greater or lesser number of platforms, and the platforms can be of other shapes. Although each system preferably comprises platforms wherein all of the platforms have the same shape, it is also possible for a system to comprise platforms of different shapes.

The panel 1, 2 and buoyancy element 3 may made of any suitable material having a density close to that of the water or other liquid in the pond to be covered. Preferably, panel and buoyancy element are comprised of a material that is resistant to degradation and destruction by exposure to daylight (UV rays), heat and chemicals. Potential materials include polyethylene (HDPE, LDPE) with a UV inhibitor. Alternative materials include thermoplastics, such as polypropylene (PP), thermoplastic polyolefin (TPO), fiberglass, foam, other plastics, polymers, polystyrene, etc. and/or combinations thereof. Optionally, the material is UV-stabilized. In yet another optional embodiment, the panel and/or the buoyancy element may be covered with a UV-resistant coating.

In various embodiments of the invention, different types and numbers of buoyancy elements 3 may be used.

The planar panel itself can serve as the buoyancy element, for example, if the planar panel is substantially comprised of a buoyant material, such as polystyrene.

In other embodiments, the panel is provided with a buoyant structure that serves as the buoyancy element or elements. For example, the buoyancy element can be created by inserting buoyant material within a cavity formed in the panel. Alternatively, one or more air spaces can be provided within the panel itself, such as by molding. For example, if the panel is comprised of a molded material, one or more air pockets or cavities can be molded into the panel during the manufacturing process.

In yet another embodiment, the buoyancy element is encapsulated partially or entirely within the panel. For example, the buoyancy element may be inserted into a pocket or cavity within the panel. In another example, the buoyancy element is co-molded with the panel, or is molded into one or more cavities within the panel. In yet another example, a substantially flexible-walled or substantially non-flexible walled container serves as the buoyancy element and is inserted into a cavity or cavities in the panel.

In still yet another embodiment, the buoyancy element is attached to the panel, and may have flexible or non-flexible walls. In such embodiments, the buoyancy element is selected from one of the following: a single inflatable substantially flexible container; a single, substantially hollow, and substantially rigid, container; a single a container filled with a buoyant material selected from foam, solids, liquids and mixtures thereof; and a single piece of a solid or semi-solid buoyant material.

In yet another embodiment, the platform includes two or more buoyancy elements. The two or more buoyancy elements are selected from the following: inflatable substantially flexible containers such as inflatable bladders or tubes; substantially hollow, and substantially rigid, containers; containers filled with a buoyant material selected from foam, solids, liquids and mixtures thereof; and pieces of a solid or semi-solid buoyant material.

In a preferred embodiment, the buoyancy element comprises a plurality of spherical buoyancy elements. An example of spherical buoyancy elements are substantially hollow, substantially rigid plastic spheres or balls. Alternatively, the buoyancy element is ellipsoid in shape.

The buoyancy element may be located at the top face 20 (the face parallel to and farthest from the pond surface) of the panel, or at the bottom face 21 of the panel (the face parallel to and closest to the pond surface). As between the buoyancy element being located at the top face or bottom face, it is preferred that it is located at the bottom face of the platform. In yet another alternative embodiment, the buoyancy element is located between the top face and bottom face of the panel.

In still yet another embodiment, as illustrated in FIG. 1, the buoyancy element 3 is located between two planar panels 1, 2. In FIG. 1, the buoyancy element 3 is a plurality of hollow spheres, and the spheres are received and held within circular orifices 10 in the first planar panel 1 and the second planar panel 2. In the illustrated embodiment, the buoyancy elements protrude above the top face 20 of the first planar panel and may also protrude below the bottom face 21 of the second planar panel 2. However, in other alternative embodiments of the platform 100, the buoyancy elements 3 do not protrude above or below the planar panels.

In another embodiment shown in FIG. 3, the platform 100 includes one planar panel 1, and the buoyancy elements 3 protrude above the top face and below the bottom face of the planar panel 1.

Buoyancy elements 3 may be used as part of a system 200 to reduce evaporation, and/or heat the surface water (or other liquid) or even the entire body of water (or other liquid) in situations where the body of water or other liquid is shallow and relatively still (very little or no movement in the water or liquid). Buoyancy elements 3 may heat up to about twice the ambient temperature when exposed to the sun, and raise the surface temperature of the liquid in the pond or other body of water significantly. The buoyancy elements 3 could be used to heat up water or other liquids (especially in cold climates) for a variety of purposes, such as to modify (increase or decrease) algae growth or to aid in processes such as waste water treatment. In addition, the buoyancy elements 3 in system 200 could also be used to raise temperatures of the surface water or liquid (or of a majority or all of the body of water or other liquid, if the body is relatively shallow and has little or no movement) sufficiently high to significantly reduce microbial and/or algal life in the body of water or other liquid. In certain situations, the system 200 could be used to raise the water temperature to about 130-150° F., which essentially sterilizes the water.

In a variation of the foregoing example, individual buoyancy elements 3 could be provided with a coupling or connecting structure, to assist in the elements staying adjacent to one another. For example, the buoyancy elements could be provided with electromagnets. In a second example, multiple buoyancy elements, such as hollow balls, are enclosed in a flexible enclosure, such as mesh, that is large enough to permit most or all of the balls to rest side by side on the surface of the water or other liquid and will retain the balls adjacent to one another, resulting in the balls form a covering over most or all of the surface of the water or liquid.

Each platform 100 is preferably provided with a coupler 4 at each edge 12, for temporarily or permanently joining together two or more platforms. Preferably, the couplers provide for reversible joining of the platforms, meaning that the platforms may be coupled, then uncoupled, then coupled again, and so on.

The couplers 4 can be mechanical, electromechanical or magnetic, or a combination, and preferably can be remotely controlled. Preferably, the coupler is electromagnetic and is remotely controllable. In a preferred embodiment, two or more platforms abut each other at their respective edges, and are held together by corresponding electromagnets on each platform 100, as illustrated in FIG. 1 by element 4.

Figure 9:
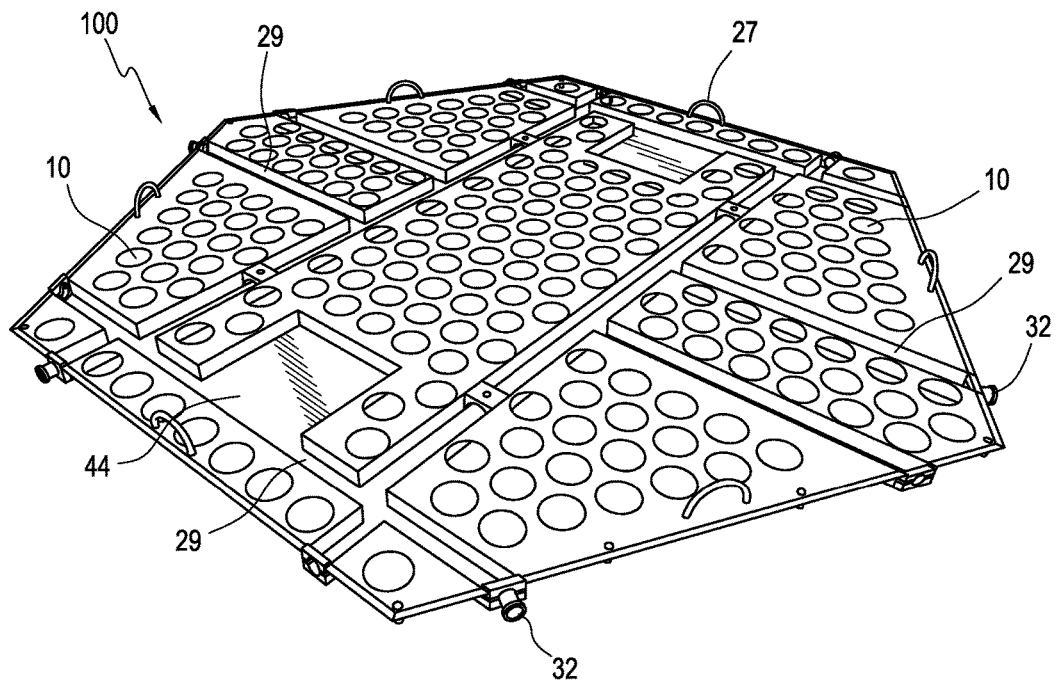
FIG. 9 is a perspective view of a platform according to an embodiment of the invention.
Figure 11:
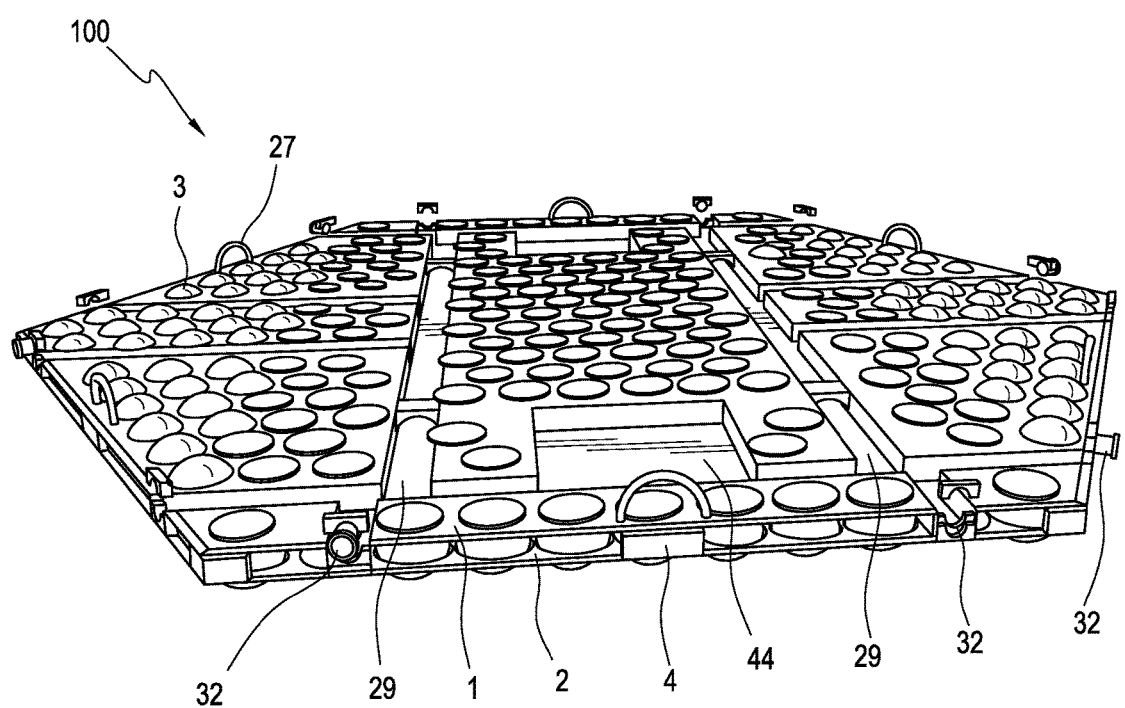
FIG. 11 is a perspective view of a modular floating platform according to an embodiment of the invention.

Shown in FIGS. 9 and 11 is a platform 100 having couplers 32 comprising a male coupler and a female coupler at each edge. The male coupler connects with a female coupler on another platform (not shown), and the female coupler connects with a male coupler on another platform (not shown). It will be appreciated that other configurations for couplers and coupling structures and systems, such as bolts, connectors, spacers, adhesives, welding or any other suitable coupling method or structure, and/or combinations thereof, may be used without straying from the spirit and scope of this disclosure. However, couplers that are reversible (i.e., capable of coupling, uncoupling, coupling, and so on) are preferred. It is also preferred that the couplers are sufficient to maintain two or more platforms connected to one another, but can be uncoupled by the operator when desired. For this purpose, electromagnetic couplers are preferred. Even more preferable are couplers than can be remotely coupled and uncoupled.

Figures 7, 8:
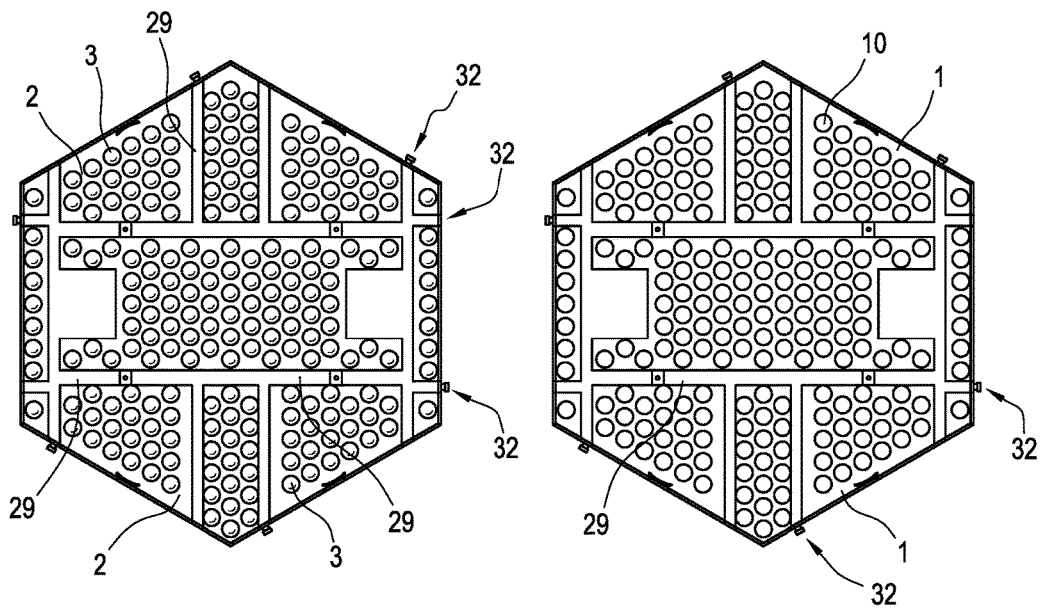
FIG. 7 is a top view of a panel that may be used in a modular floating platform according to an embodiment of the invention, showing spherical buoyance elements seated in orifices of the panel.
FIG. 8 is a top view of a second panel that may be used in conjunction with the panel of FIG. 7, for use in a modular floating platform according to an embodiment of the invention comprising two platforms. The view of the second panel is of its bottom surface.

Also shown in FIGS. 7, 9 and 11 and other figures are optional spaces or trays 44 on the platform 100 for receiving junction boxes and/or other components used for or in conjunction with photovoltaic or other systems on the platform 100.

Optionally, the platform 100 may be anchored using weights to the bottom of the pond in which the platform is used, to reduce or prevent movement of the platform and/or the system comprising the platform.

Optionally, the platform 100 may be tethered to a connection point at the bottom or side of the pond or to another object, such as a dock, a barge, a boat or any other non-moving or moving object. As shown in FIGS. 2C, 9, 10B and 11, the platform may optionally include handles 27, to which a rope, chain, tie-line or other tether may be attached for the purpose of towing the platform or securing it to the dock, shore or even anchoring it to the bottom of the pond. In some embodiments, the handles 27 may also be used as handholds, so that operators of the platforms and system can grab the handles and hold or move the platforms 100.

In certain embodiments, each platform 100 is equipped with at least one propulsion system for moving the platform 100 from one location on the surface of the pond to another location. The propulsion system, in combination with a control system, permits an operator to control the movement and placement within the pond of individual platforms 100 as well as the entire system 200 comprising multiple platforms 100. The control system and propulsion system permit the operator to guide each platform towards one or more other platforms, for the purpose of aligning the platforms and connecting them together to form a system 200.

The control system and propulsion system are preferably remotely controlled. Even more preferably, they are wirelessly remotely controlled. Optionally, the platform 100 may include a global positioning system (GPS) to assist with controlling the position and directional movement of the platforms 100. If the platform(s) are provided with solar panels, the solar energy collected and stored onboard the platform(s) may be used to power the control system and/or the propulsion system.

Using the control system and propulsion system, the operator can add or subtract platforms from the systems, thereby controlling the size of the system 200, and thereby optimize water evaporation reduction from the pond.

The control system may optionally control the couplers 4 that maintain two or more platforms 100 together. The control system may also optionally be used to control other on-board components, such as batteries, photovoltaic cells, energy management components, energy generation components, etc.

Furthermore, the GPS and/or control system may be powered via on-board photovoltaic cells (one or more solar panels). Power from the solar panel may be stored on board the platform 100 in batteries, and may optionally be used to power components on board the platform 100. For example, power generated may be used offsite, or used locally in other aspects of the mining operation such as in pump barges used to pump reusable water out of the tailing pond, among other uses in remote mining areas.

Figure 16:
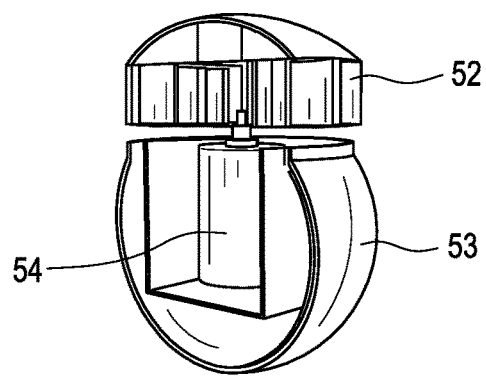
FIG. 16 is cross-sectional view of the a magnified view of the interior of the propulsion system shown in FIG. 15.
Figure 17:
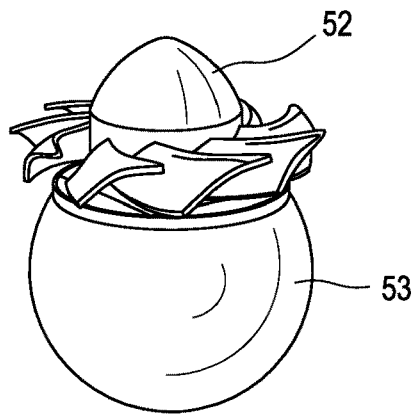
FIG. 17 is a perspective view of an embodiment of a propulsion system for use in a modular floating platform according to an embodiment of the invention.
Figure 18:
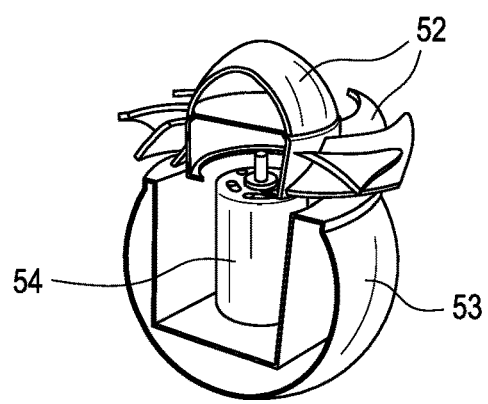
FIG. 18 is a cross-sectional view of the propulsion system shown in FIG. 17.

In addition to, or instead of solar panels, the platform 100 may include wind turbines to capture wind energy. FIGS. 15-18 show examples of potential wind turbine configurations that may be used, although any type of device capable of capturing wind energy can be used. Referring to FIGS. 15-18, each wind turbine 52 may be provided with a spherical base 53 that may or may not be comprised of buoyant material. The spherical base 53 is preferred, but not required. If the wind turbine has a spherical base, it can be seated in an orifice 10 of the platform 1 and/or 2, in substitution for a dedicated buoyancy element 3. Also shown in FIGS. 16 and 18 are generators for converting wind energy to electrical energy.

Figure 10A:
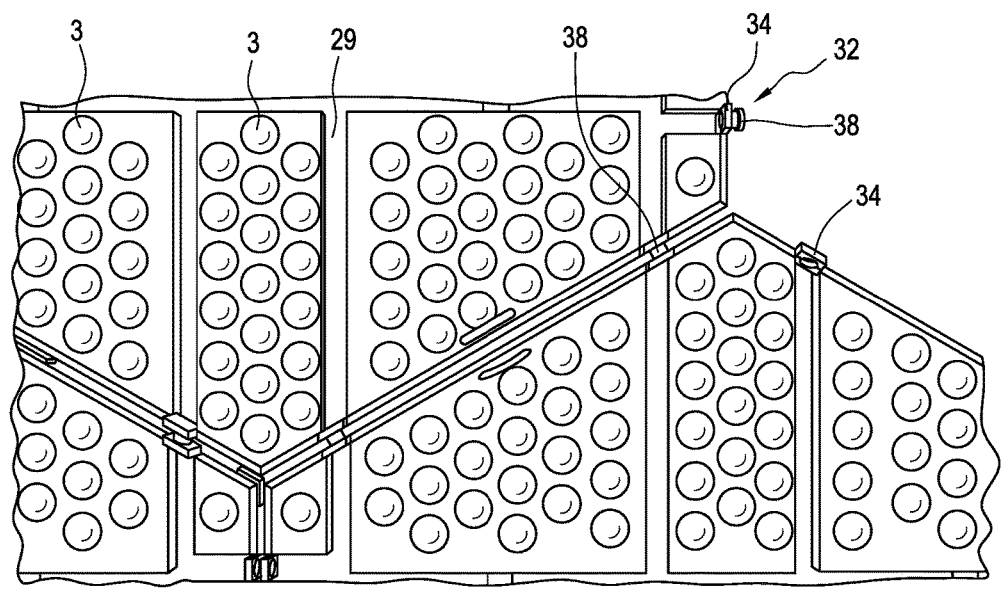
FIG. 10A is a close-up view of a portion of the system shown in FIG. 12, and illustrates the joining of three modular floating platforms, which are only partially shown.
Figure 10B:
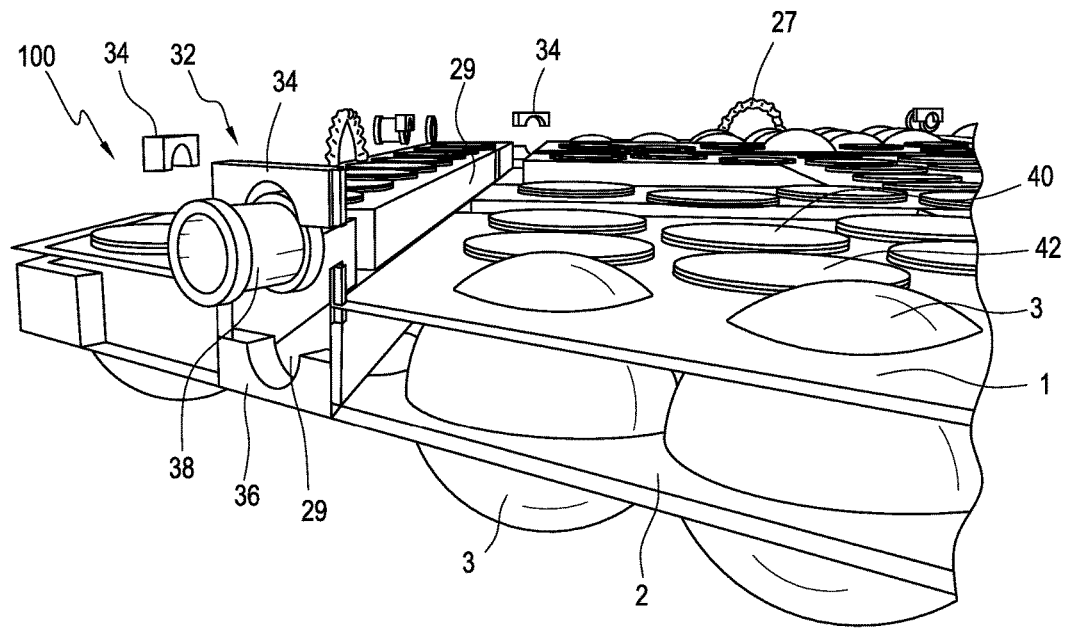
FIG. 10B is a close-up view of a platform shown in FIG. 9, illustrating an electrical connector structure.

In a preferred embodiment of the invention wherein the platform 100 is comprised of a plurality of buoyancy elements, one or more of the buoyancy elements may be provided with an additional function. For example, a buoyancy element can be provided with a photovoltaic cell, a battery, a wind turbine, a propulsion system (such as a propeller), or a hydroponic planter. Alternatively, one or more of the buoyancy elements can be replaced with a component such as a photovoltaic cell, a battery, a wind turbine, a propulsion system (such as a propeller), or a hydroponic planter. If a buoyancy element is replaced with another component, then optionally the component may include a portion that is shaped and sized similar to that of the buoyancy element replaced, so that the component can be readily seated within a housing or orifice that the buoyancy element would otherwise occupy. FIGS. 13-18 illustrate various components having a portion shaped similar to a spherical buoyancy element. FIG. 10B shows a platform 100 according to the invention wherein some of the buoyancy elements are replaced with photovoltaic cells 40, and batteries 42.

The control system may be implemented on a general purpose, specific purpose, personal computer, or other computing device. The control system may be located on the platform 100, such as under the solar panel. Furthermore, the control system may be located in a remote location, accessed via wired or wireless communication. The location of the control system may be near the pond, or not.

Figure 13:
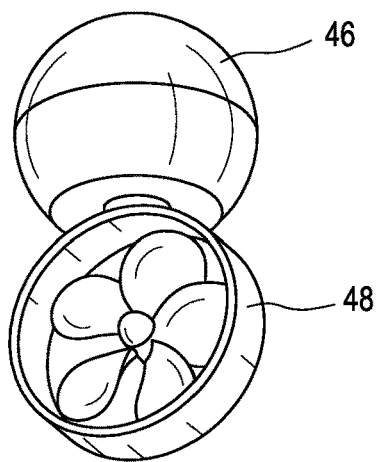
FIG. 13 is a perspective view of an embodiment of a propulsion system for use in a modular floating platform according to an embodiment of the invention.
Figure 14:
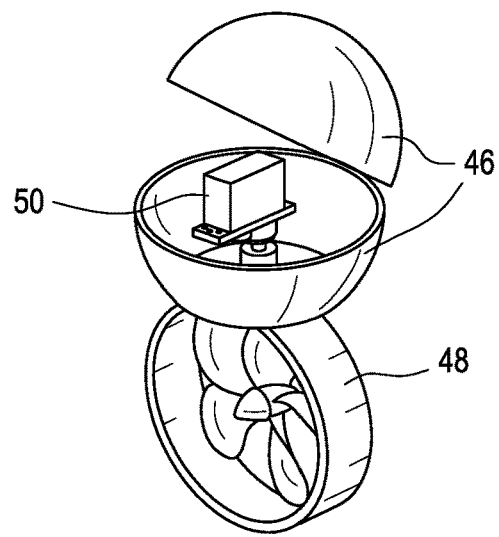
FIG. 14 is a magnified view of the interior of the propulsion system shown in FIG. 13.
Figure 15:
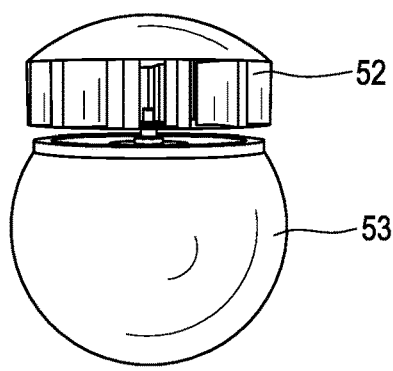
FIG. 15 is a perspective view of an embodiment of a wind turbine electricity generation unit for use in a modular floating platform according to an embodiment of the invention.

The propulsion system may comprise a structure primarily below the surface of the pond, or alternatively a structure primarily above the surface of the pond. In embodiments where the propulsion system is located primarily below the pond's surface, the propulsion unit may be selected from the following: propeller, impeller, paddle wheel, or pump jet (hydrojet). FIGS. 13 and 14 illustrate a propeller 48 that in use is disposed below the surface of the water. Preferably, the propeller is capable of pivoting, and is remotely controllable by the operator, for steering and moving the platform 100 and/or the system 200. In embodiments wherein the propulsion unit is primarily above the pond's surface, the propulsion unit may be a sail, fan or aircraft-type propeller such as used in airboats.

In other embodiments, two or more platforms 100 can be manually joined (without need for propulsion units or control mechanisms) to form a system 200 (also referred to herein as an assembly) to cover surfaces of a pond or other generally large body of water or other liquid.

FIG. 1 shows an embodiment of the hexagonal-shaped, substantially planar platform 100 described herein. Platform 100 may include one or more substantially, planar, hexagonal-shaped constructive panels 1 and 2, one or more buoyancy elements 3; a coupler 4 for joining a platform 100 to a second platform 100; connection 9 for joining panels 1 and 2 to one another; and base 5 for the one or more propulsion units 6; one or more pivotable supports for providing directional movement of the propulsion unit(s); one or more photovoltaic cells or solar panels 8, and a global positioning system. This hexagonal-shaped embodiment of the platform 100 has six edges 12.

As shown in FIG. 1, each panel 1 and 2 may have orifices 10 shaped and positioned to allow the buoyancy element 3 to partially extend there through. The panels coupled together capture the buoyancy elements 3 there between, and partially within the orifices 10. Each buoyancy element can may not be rigidly coupled to the panels, so that buoyancy element cannot move within the orifices 10. In a preferable alternative embodiment, one or more of the buoyancy elements are able to move within the orifices, which will make it less likely that liquids will pool or collect on the platform, as liquid that may collect on the panel will drain back into the pond through the orifices as the buoyancy element moves. The diameter of the orifices 10 are preferably chosen to maintain the buoyancy elements in place, yet allow water from the pond to drain off the panels through spaces between the buoyancy elements and the orifices.

Shown in FIG. 1 are connectors 13 which secure panels 1 and 2 to one another and keep them from moving relative to one another. The gap between panels 1 and 2 also may allow liquids to drain off the platform, thereby making the platform 100 more buoyant, and less likely to sink. Furthermore, the panels may contain additional perforations to further allow liquids to drain off of the platforms 1A and 1B. This configuration will also allow wind to pass through, making it more likely that the platform 100 will mitigate uplift and lateral movement in strong winds. Furthermore, if spherical or elliptical shaped buoyancy elements 3 are used, this will also reduce the likelihood that the wind will lift the platform 100 (and the system 200) off of the surface of the pond or liquid. In the embodiment shown in FIG. 1, the buoyancy elements are hollow spheres having about a 4 inch diameter, but spheres of other diameters may be used as well.

As shown in the example of FIG. 1, propulsion system 6 may include a fan or turbine and may be provided with support element 7 to provide support for the fan or turbine. Further, the propulsion unit 6 and/or support element 7 may be provided with a platform or base 5 capable of rotating or swiveling to change the direction in which the propulsion unit points, thereby permitting the platform 100 to vary directional movement. In an embodiment, the base 5 may be remotely rotated or swiveled. In an embodiment of the invention, the base 5 may swivel or rotate about ±45°.

As shown platform 100 may include two propulsion units 6. However, one may provide sufficient propulsion for the device 100. Other numbers of propulsion units 6 may be used depending on design and implementation considerations, such as size of the platform 100, size of the system 200 comprising multiple platforms, power consumption requirements, wind, etc.

Platform 100 can optionally include solar panels photovoltaic cells 8 to capture solar energy and generate electrical energy, and in some embodiments these provide power for the propulsion system and/or other components of the platform 100. Because the tailings ponds are typically not covered and are in areas with little shade or vegetation, a relatively large amount of sunlight may be available.

Platform 100 may also include batteries to store electrical energy generated via solar or wind. The batteries may be located under the solar panel 8, in a buoyancy element 3, or other location on or in platform 100.

The solar panels 8 may be electrically coupled to the battery and to other platforms 100, such that power may be delivered between platforms. The platforms may include electrical wiring, electrically conductive conduits, or channels or conduits for receiving electrical wires, as illustrated in FIGS. 7-11. FIGS. 7-11 illustrate raceways or conduits or channels (referred to herein as "raceways") which themselves are electrically conductive or house wiring. The layout of these raceways 29 is designed so that one or more of the raceways on each platform meets the edge of the platform at a point where it will abut a corresponding raceway on an adjacent platform, as illustrated in FIG. 12.

Preferably, each point on the platform 100 where the raceways 29 meet the edge(s) of the platform further comprises an electrical connector structure 32 by which wiring from one platform 100 may be connected with wiring on an adjacent platform. FIGS. 7, 8, 9 and 10A illustrate a proposed layout of raceways 29, although other layouts are within the scope of the invention. FIG. 10B is a close up of an exemplary embodiment of an electrical connector structure 32. In this example, hubs 34 and 36 are disposed on either side of a tubular conduit 38, and retain the tubular conduit 38 in place at the edge of the platform 100 where the raceway 29 meets the edge 12. FIG. 10B shows an exploded view of structure 32, with hubs 34 and 36 not yet seated and not yet adjacent to conduit 38. The embodiment of the platform 100 illustrated in FIG. 10B includes at least one photovoltaic panel 40 in a diameter approximately the size of an orifice 10 in the panel 1. Optionally, the photovoltaic panel has a spherical base (not shown in this figure). Yet another option would be for the spherical base to further comprise a buoyancy element. Shown in FIG. 10B is an optional battery 42, for storing energy generated by a photovoltaic cell or wind turbine (not shown in this figure). Multiple photovoltaic cells 40 and/or batteries 42 may be used on a single platform 100.

A hexagonal-shaped platform is preferred due to the advantages it provides, including the ability to easily align raceways on multiple platforms. An additional advantage of hexagonal-shaped platforms is the stability provided due to the ability of each platform to align and join with as many as six other hexagonal-shaped platforms. Further, even if a hexagonal-shaped platform is joined with only 2 or 3 other hexagonal-shaped platforms, the joined platforms are stable. FIG. 10 is a close-up view of three hexagonal-shaped platforms joined together, and illustrates the alignment of raceways 29.

In the hexagonal-shaped embodiment of the invention, the platform 100 is provided with a raceway that is substantially directly connectable at each of the panel device's six edges to a raceway on another platform. Preferably, the placement of electrical pathways meet the edges of the platform 100, so that when more than one platform 100 is used, the raceways on each platform meet one another.

The various optional components described herein can be added and removed from the platform in a modular fashion, particularly if the platform includes elements for receiving modular components. In the embodiment shown in FIG. 1, some of the buoyancy elements 3 can be replaced by another component having a spherical base that can be seated within one or more of the orifices 10 in the panels 1, 2. another.

For example, as shown in FIGS. 13 and 14, the propulsion system may include a spherical base 46 that is configured to be seated within an orifice 10 in the panel 1 or 2 (or both panels 1 and 2), a motor 50 and a propeller 48 extending below the pond's surface. FIG. 1 shows a propulsion system 6 wherein the base 5 may alternatively be spherically shaped and seated within an orifice 10.

In an alternative embodiment of the invention, one or more of the buoyancy elements 3 could be replaced with planters for growing plants, wherein the plants' roots are directly exposed to pond water or are in a medium or soil that is constantly or periodically moistened by the pond water. This hydroponic embodiment of the invention would typically be used in bodies of water other than mine tailings ponds, if the mine tailings ponds are not conducive to plant growth.

In still yet another embodiment, the platform may be provided with cleaning attachments to clean up hazardous waste spills and harvest plastic waste from ponds and oceans and other bodies of water.

The platforms 100 and systems 200 may be buoyant enough to support lightweight aircraft, such as a helicopter, drone, etc., and in such event may include a landing pad for same. In yet another embodiment the system may be configured to use the generated electrical power to repower an electrical powered vehicle.

Experimental Data

A comparison of the evaporation rates of an open body of water with and without coverage by an assembly of hexagonal panels as disclosed herein shows the positive effects of a protective layer over the surface of the water. The inventors have found that with about 80% coverage of the body of water, the evaporation rate drops by about 87%, when measured in the Tucson, Ariz. area with temperatures above 100° F. Furthermore, about 50% coverage with an assembly of buoyant devices according to the invention may lower the evaporation rate by close to about 40%, resulting in significant savings in many industries that heavily depend on water for the production and recuperation of their primary products. The amount of water saved by reducing evaporation may be larger than about 130% when about 85% of the body of water surface area is covered, when measured in the Tucson area with temperatures above 100° F.

The included descriptions and figures depict specific implementations to teach those skilled in the art how to make and use various examples. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations. As a result, the invention is not limited to the specific implementations described above, but only by the claims and their equivalents.

The invention claimed is:

1. A buoyant platform comprising:
   a substantially planar panel having a top face, a bottom face and at least one edge;
   a buoyancy element integrated on or in the panel; and
   a coupler on or adjacent the edge of the panel for joining the platform to another buoyant platform,
   wherein the buoyancy element is: (a) the panel, and the panel is comprised of a buoyant material; (b) substantially encapsulated by the panel; or (c) attached to the panel,
   wherein the buoyancy element is selected from the group consisting of: (a) an inflatable substantially flexible container; (b) a substantially hollow, substantially rigid container; (c) a container filled with a buoyant material selected from foam, solids, liquids and mixtures thereof; and (d) a solid or semi-solid buoyant material, and
   wherein the buoyancy element comprises a plurality of spherical or elliptical buoyancy elements.

2. The platform of claim 1, wherein the panel has orifices for receiving the spherical or elliptical buoyancy elements.

3. The platform of claim 1, wherein the top face, the bottom face or both the top face and the bottom face of the panel is hexagonal-shaped.

4. The platform of claim 1, further comprising a propulsion system.

5. The platform of claim 4, further comprising a control system configured to control a position of the platform, or to control the propulsion system, or to control selective coupling and decoupling of the platform to another platform.

6. The platform of claim 5, wherein the control system comprises at least one of the following: a global positioning system or a wireless remote communication module.

7. The platform of claim 1, further comprising a photovoltaic cell capable of producing electrical energy, and batteries coupled to the photovoltaic cell configured to receive and store produced electrical energy from the photovoltaic cell.

8. The platform of claim 3, further comprising a photovoltaic cell capable of producing electrical energy, and batteries coupled to the photovoltaic cell configured to receive and store produced electrical energy from the photovoltaic cell.

9. The platform of claim 4, further comprising a photovoltaic cell capable of producing electrical energy, and batteries coupled to the photovoltaic cell configured to receive and store produced electrical energy from the photovoltaic cell.

10. The platform of claim 1, wherein the panel further comprises one or more of the following: electrical wiring, an electrically conductive conduit, a channel for receiving wires, or a conduit for receiving wires, wherein said wiring, electrically conductive conduit, channel for receiving wires or conduit for receiving wires is connectable at the edge of the panel to corresponding wiring, an electrically conductive conduit, a channel for receiving wires or a conduit for receiving wires on another platform.

11. The platform of claim 2, wherein the panel further comprises one or more of the following: electrical wiring, an electrically conductive conduit, a channel for receiving wires, or a conduit for receiving wires, wherein said wiring, electrically conductive conduit, channel for receiving wires or conduit for receiving wires is connectable at the edge of the panel to corresponding wiring, an electrically conductive conduit, a channel for receiving wires or a conduit for receiving wires on another platform.

12. The platform of claim 3, wherein the panel further comprises one or more of the following: electrical wiring, an electrically conductive conduit, a channel for receiving wires, or a conduit for receiving wires, wherein said wiring, electrically conductive conduit, channel for receiving wires or conduit for receiving wires is connectable at the edge of the panel to corresponding wiring, an electrically conductive conduit, a channel for receiving wires or a conduit for receiving wires on another platform.

13. The platform of claim 1, comprising: a first substantially planar panel and a second substantially planar panel disposed substantially parallel to one another, and each panel having: a top face and a bottom face that is hexagonal-shaped, six edges, and orifices transversing the top face through the bottom face of each panel; a plurality of spherical buoyancy elements disposed between the first and second panels, and seated within the orifices in each panel; and at least one coupler on or adjacent each edge of the first panel, the second panel or both panels for joining the platform to another buoyant platform.

14. The platform of claim 13, further comprising a propulsion system and a control mechanism.

15. The platform of claim 13, further comprising a photovoltaic cell capable of producing electrical energy, and batteries coupled to the photovoltaic cell configured to receive and store produced electrical energy from the photovoltaic cell.

16. The platform of claim 14, further comprising a photovoltaic cell capable of producing electrical energy, and batteries coupled to the photovoltaic cell configured to receive and store produced electrical energy from the photovoltaic cell.

17. The platform of claim 1, further comprising a hydroponic planter or a wind turbine.

18. The platform of claim 1, wherein one or more of the buoyancy elements is provided with or replaced with one or more components selected from the group consisting of: a photovoltaic cell, a battery, a wind turbine, a propulsion system, and a hydroponic planter.

19. A buoyant platform system comprising a plurality of the platforms of claim 1, wherein the platforms may be reversibly coupled to one another.

20. A buoyant platform system comprising a plurality of the platforms of claim 13, wherein the platforms may be reversibly coupled to one another.

21. A buoyant platform system comprising a plurality of the platforms of claim 14, wherein the platforms may be reversibly coupled to one another.

22. A buoyant platform system comprising a plurality of the platforms of claim 15, wherein the platforms may be reversibly coupled to one another.

23. A method for reducing evaporation from a body of water or other liquids, comprising placing the system of claim 19 on the surface of the body of water or other liquids and coupling the edges of the platforms to one another.

24. A method for reducing evaporation from a body of water or other liquids, comprising placing the system of claim 20 on the surface of the body of water or other liquids and coupling the edges of the platforms to one another.

25. A buoyant platform comprising:
a substantially planar panel having a top face, a bottom face and at least one edge;
a buoyancy element integrated on or in the panel;
a coupler on or adjacent the edge of the panel for joining the platform to another buoyant platform,
a propulsion system; and
a control system configured to control position of the platform, or to control the propulsion system, or to control selective coupling and decoupling of the platform to another platform,
wherein the buoyancy element is: (a) the panel, and the panel is comprised of a buoyant material; (b) substantially encapsulated by the panel; or (c) attached to the panel, and
wherein the buoyancy element is selected from the group consisting of: (a) an inflatable substantially flexible container; (b) a substantially hollow, substantially rigid container; (c) a container filled with a buoyant material selected from foam, solids, liquids and mixtures thereof; and (d) a solid or semi-solid buoyant material.

26. A buoyant platform comprising:
a first substantially planar panel and a second substantially planar panel disposed substantially parallel to one another, and each panel having: a top face and a bottom face that is hexagonal-shaped, six edges, and orifices transversing the top face through the bottom face of each panel;
a plurality of spherical buoyancy elements disposed between the first and second panels, and seated within the orifices in each panel; and
at least one coupler on or adjacent each edge of the first panel, the second panel or both panels for joining the platform to another buoyant platform.

27. The platform of claim 26, further comprising a propulsion system and a control mechanism.

28. The platform of claim 26, further comprising a photovoltaic cell capable of producing electrical energy, and batteries coupled to the photovoltaic cell configured to receive and store produced electrical energy from the photovoltaic cell.

29. A buoyant platform system comprising a plurality of the platforms of claim 26, wherein the platforms may be reversibly coupled to one another.

30. A method for reducing evaporation from a body of water or other liquids, comprising placing the system of claim 29 on the surface of the body of water or other liquids and coupling the edges of the platforms to one another.

* * * * *